United States Patent
Schiller et al.

(10) Patent No.: US 11,505,147 B2
(45) Date of Patent: Nov. 22, 2022

(54) MOTOR VEHICLE BUMPER

(71) Applicant: BENTELER AUTOMOBILTECHNIK GMBH, Paderborn (DE)

(72) Inventors: Andreas Schiller, Geseke (DE); Elmar Mollemeier, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 89 days.

(21) Appl. No.: 17/177,646

(22) Filed: Feb. 17, 2021

(65) Prior Publication Data

US 2021/0276503 A1 Sep. 9, 2021

(30) Foreign Application Priority Data

Feb. 17, 2020 (DE) .................... 10 2020 104 097.0

(51) Int. Cl.
*B60J 7/00* (2006.01)
*B60R 19/34* (2006.01)
*B60R 19/12* (2006.01)

(52) U.S. Cl.
CPC .............. *B60R 19/34* (2013.01); *B60R 19/12* (2013.01)

(58) Field of Classification Search
CPC . B60R 19/18; B60R 2019/1813; B60R 19/48; B60R 2019/1886; B60R 19/34; B65D 51/145; B65D 41/045; B65D 41/3428; B65D 50/041; B65D 41/34
See application file for complete search history.

(56) References Cited

U.S. PATENT DOCUMENTS

| 3,869,167 | A | * | 3/1975 | Muller | .................... | B60R 19/18 267/140 |
| 3,897,095 | A | * | 7/1975 | Glance | .................... | B60R 19/26 267/116 |
| 3,938,841 | A | * | 2/1976 | Glance | .................... | B60R 19/18 267/116 |

(Continued)

FOREIGN PATENT DOCUMENTS

DE 102008059750 B4 8/2017

OTHER PUBLICATIONS

Office Action for German Application No. 10 2020 104 097.0 dated Oct. 22, 2020; 11 pp.

*Primary Examiner* — Kiran B Patel
(74) *Attorney, Agent, or Firm* — Hauptman Ham, LLP

(57) ABSTRACT

A motor vehicle bumper that has a transverse carrier which can be secured transversely relative to the longitudinal carriers of the motor vehicle by crash boxes. The transverse carrier has a shell member which is open toward the front side and which has a rear wall and two outer members which are both adjoined at the end side by an outwardly directed longitudinal flange. The shell member has a central longitudinal portion which is adjoined in the direction toward the two ends of the transverse carrier by a transition portion, an intermediate portion, a crash box connection portion and an end portion. The shell member is closed at least over the majority of the length thereof by a closure plate which forms the front side. In the transition portions, the shell member has a minimum depth which is less than the maximum depth in the central longitudinal portion.

15 Claims, 6 Drawing Sheets

(56) References Cited

U.S. PATENT DOCUMENTS

| | | | |
|---|---|---|---|
| 2002/0047281 A1* | 4/2002 | Hartel | B60R 19/18 |
| | | | 293/146 |
| 2010/0133859 A1* | 6/2010 | Lutke-Bexten | B60R 19/18 |
| | | | 293/102 |
| 2011/0109105 A1* | 5/2011 | Ralston | B60R 19/18 |
| | | | 293/132 |
| 2018/0105129 A1* | 4/2018 | Hodoya | B60R 19/03 |
| 2020/0164820 A1* | 5/2020 | Baas | B23K 26/262 |
| 2021/0053517 A1* | 2/2021 | Baas | B60R 19/18 |
| 2021/0276503 A1* | 9/2021 | Schiller | B60R 19/12 |
| 2022/0001818 A1* | 1/2022 | Rudlof | B60R 19/18 |

* cited by examiner

MOTOR VEHICLE BUMPER

RELATED APPLICATIONS

The present application claims priority of German Application Number 10 2020 104 097.0 filed Feb. 17, 2020, the disclosure of which is hereby incorporated by reference herein in its entirety.

FIELD

The disclosure relates to a motor vehicle bumper.

BACKGROUND

Bumpers are installed as standard in motor vehicles both at the front and at the rear end, in order to absorb the impact energy of small collisions so that the actual carrier structure of the motor vehicle is not damaged to the greatest possible extent. A bumper has a transverse carrier which can be secured with crash boxes being interposed transversely relative to the longitudinal boxes of the motor vehicle frame. The transverse carrier is used to introduce the energy resulting from an impact into the crash boxes, where the impact energy is intended to be converted into deformation work. EP 1 638 815 B1 relates to a bumper for a motor vehicle. This bumper has a transverse carrier which can be secured transversely relative to the longitudinal carriers of the motor vehicle by means of crash boxes. The transverse carrier comprises a shell member which is open at the front side and which has a rear wall and two outer members which are adjoined at the end side in each case by an outwardly directed longitudinal flange. The shell member has in a longitudinal direction a plurality of part-pieces and has a central longitudinal portion which is adjoined at both sides in the direction toward the ends of the transverse carrier by an intermediate portion, a crash box connection portion and an end portion.

Bumpers must comply with legal regulations and the requirements stipulated by the consumer protection organizations for pedestrian protection. Furthermore, the requirements from the classification test of insurance companies have to be complied with. At the same time, there is the requirement for optimum use of structural space and capacity for assembly, high energy absorption capacity and the most lightweight construction possible with acceptable costs.

In the course of increasing electromobility, the proportion of electric vehicles which are involved in traffic is increasing. Electric vehicles, as a result of the arrangement of the drive in the vehicle, are softer in the front region and have a lower resistance capacity than a vehicle with an internal combustion engine. Attempts have been made to compensate for this by means of the motor vehicle structure, the bumpers.

SUMMARY

An object of the disclosure is to provide a functionally improved motor vehicle bumper which has a high energy absorption capacity with an improved deformation behavior in the event of impact with a stationary obstacle in the event of a central impact.

The motor vehicle bumper has a transverse carrier which can be secured transversely relative to the longitudinal carriers of the motor vehicle by means of crash boxes. The transverse carrier has a shell member which is open toward the front side and which has a rear wall and two outer members which are adjoined in each case at the end side or opening side by an outwardly directed longitudinal flange. The shell member has in the longitudinal extent thereof a central longitudinal portion which is adjoined in each case in the direction toward the two ends of the transverse carrier by a transition portion, an intermediate portion and a crash box connection portion and optionally an end portion.

The shell member is closed at least over the majority of the length thereof by a closure plate which forms the front side. The closure plate extends over more than half of the length of the shell member. The shell member is closed over at least 70% of the length thereof by the closure plate. In at least one embodiment, the closure plate extends at the front side of the shell member at least beyond the crash boxes. The closure plate consequently extends over the central longitudinal portion in the direction toward both ends at least still over the transition portion, the intermediate portion and the crash box connection portion.

The closure plate may also extend over the entire length of the shell member. It is also possible for the closure plate to terminate shortly before the ends of the shell member, for example, with a spacing from the ends which corresponds to 10% of the length of the shell member.

In the rear wall region of the central longitudinal portion and in the rear wall region of the transition portions, the shell member has a continuous bead which is directed toward the front side so that the shell member in the central longitudinal portion and in the transition portions has a W-shaped profile in cross-section. In the transition portions, the shell member has a minimum depth which is less than the maximum depth in the central longitudinal portion. The minimum depth in the transition portion and the maximum depth in the central longitudinal portion is in each case measured in the vehicle x axis between a foremost outer face of the shell member and a rearmost outer face of the shell member.

The depth of the shall member in the intermediate portions and the crash box connection portions is greater than the minimum depth of the shell member in the transition portion. In the crash box connection portions, the shell member has a depth which is between the minimum depth of the shell member in a transition portion and the maximum depth of the shell member in the central longitudinal portion.

The central bead extends over the central longitudinal portion and the transition portions as far as the intermediate portions and can terminate at that location in the rear wall of the shell member. In the end-side longitudinal portions of the intermediate portion and in the crash box connection portions and in the optional end portions, the shell member has a U-shaped or hat-shaped profile. The bead may also extend over the length of the shell member, wherein from the maximum depth in the central longitudinal portion it becomes flatter in the direction of the end portions.

The bumper according to the disclosure has a high energy absorption capacity with improved deformation behavior. The geometric configuration of the shell member in combination with the closure plate leads to a functionally improved transverse carrier with a high energy absorption capacity and a deformation behavior in which an obstacle, a stationary obstacle, such as a tree or a pole, is surrounded in the event of an impact. A bending in the longitudinal extent of the transverse carrier is counteracted. Consequently, the use of ultra-high-strength cold-forming steels for the shell member and for the closure plate is also possible. In the context of the disclosure, there is provision for the shell member and/or the closure plate to be constructed as hot-formed and press-hardened steel components. The shell member of the transverse carrier has a tensile strength greater than 1300 MPa.

The bumper according to the disclosure also enables a weight saving to be achieved compared with known systems with comparable crash performance.

In the central longitudinal portion and in the transition portions, the shell member has a W-shaped profile. The central bead in the shell member may terminate at the beginning of the intermediate portions or run in the intermediate portion into the rear wall. Toward the outer side, the shell member is configured in the form of a hat, wherein the outer members are adjoined at the end side in each case by an outwardly directed longitudinal flange. The shell member is closed by means of the closure plate. This plate extends at least over the majority of the length of the shell member.

The transition portions to the left and right of the central longitudinal portion are configured as triggers which initiate or initially deform the deformation. This leads to the structure of the transverse carrier in the impact region being placed around an obstacle and surrounding it. The transverse carrier deforms selectively initially in the transition portions, whereas the central longitudinal portion of the transverse carrier is initially displaced in a limited manner axially in the x direction.

An aspect of the disclosure makes provision in this context for the rear wall region to extend in a concave manner in the transition portions. This curvature, which extends when viewed from the motor vehicle in the direction toward the front side of the transverse carrier, leads to a tapered cross-section in the transition portions.

The length of the outer members in the transition portions is reduced compared with the length of the outer members in the central longitudinal portion. The member length is reduced by at least 5%, at least 10%, at least 15%, or up to a maximum of 25% compared with the length of the outer members in the central longitudinal portion.

The bead of the shell member has a front web. The web extends parallel with the front side of the shell member between the front ends of the inner members of the bead. The shell member contacts the closure plate with the front web. The bead is deep in the central longitudinal portion, and extends from the rear wall over at least half of the depth of the shell profile in the central longitudinal portion, or reaches almost as far as the front side of the shell member. This can improve the rigidity behavior of the transverse carrier.

At least one embodiment makes provision for the front web of the bead and the closure plate to be joined to each other. The buckling resistance is thereby further improved. The vibration behavior under dynamic loading is thus also improved. The joining is carried out in a materially engaging manner by means of welding. To this end, for example, a plug welding in the contact region of the bead and closure plate can be carried out. A continuous weld joint can be carried out by means of laser welding.

In an alternative embodiment, there may be a gap between the front web of the bead and the closure plate. The gap or spacing between the front web and closure plate is comparatively small and is approximately from 3 to 5 mm.

At least one embodiment makes provision for the closure plate to have at least one closure plate bead which extends in the longitudinal direction thereof. The closure plate bead is configured in a groove-like manner and is directed inward toward the shell member.

There may be provided a plurality of closure plate beads which are arranged one above the other with vertical spacing. A central closure plate bead extends substantially in the horizontal central longitudinal plane of the transverse carrier. The central closure plate bead extends over the central longitudinal portion, the transition portions and the crash box connection portions as far as the optional end portions.

If two or more closure plate beads are provided, they may have different lengths from each other, such as an embodiment having a central closure plate bead and an upper closure plate bead which is arranged above it and a lower closure plate bead which is arranged below it, the upper closure plate bead and the lower closure plate bead are shorter than the central closure plate bead. The upper closure plate bead and the lower closure plate bead may be configured to have different lengths and may have lengths which are different from each other.

The central closure plate bead may extend as far as the respective end of the end portions. At least one embodiment makes provision for the central closure plate bead to terminate slightly before the outer ends of the closure plate or shell member.

A closure plate bead, such as the central closure plate bead, may have in the region of the end portions a bead end portion which extends from the longitudinal axis of the closure plate transversely in an upward or downward direction.

An embodiment of the bead path makes provision for the bead end portion to terminate at the upper or lower longitudinal edge of the closure plate. This brings about an additional transverse reinforcement.

In at least one embodiment, the closure plate is provided in the region of the transition portions with weakness zones. These may, for example, be vertical slots or also perforations which weaken the closure plate in the region of the transition portions. With a hot-formed and press-hardened closure plate, non-hardened regions may also be provided for this purpose, such as so-called soft strips. As a result of the weakness zones in the closure plate in the transition portions, the trigger behavior of the transverse carrier is supported.

Another aspect of the disclosure makes provision for the bead of the shell member to have two inner members which extend in an inclined manner obliquely at an opening angle relative to the vehicle x axis.

At least one embodiment involves the opening angle being sized to be between 3 degrees and 20 degrees inclusive. Such an embodiment has an effect on the deformation behavior of the shell member and consequently on the crash performance. The inner members become deformed in the rear portion thereof which is directed toward the rear wall inwardly toward each other and are supported against each other. At the same time, the outer members of the shell member are formed inward. This deformation behavior and the mutual support of the inner members is for the crash performance.

Furthermore, the shell member has in the central longitudinal portion a height measured at the rear side or rear wall between the outer members in the vehicle z axis which is less than the height which the shell member has in the crash box connection portion, wherein the height in the crash box connection portion is also measured at the rear wall between the outer members in the vehicle z axis.

The functionality of the bumper with regard to energy absorption capacity and deformation behavior may further be configured in that the shell member has a length L1 measured between mutually facing inner side walls of the crash boxes and the shell member has a length L2 measured between the centers of the transition portions, wherein the length L2 is sized to be from 0.15 to 0.5 times the length L1.

The deformation behavior and the energy absorption capacity of the bumper as a whole can be further improved by the crash boxes having desired deformation locations.

At least one embodiment makes provision for these desired deformation locations to be formed in each case by a vertical bead in an inner side wall of the crash box.

BRIEF DESCRIPTION OF THE DRAWINGS

Embodiments are described in greater detail below with reference to the drawings, in which.

Mutually corresponding members and components are given the same reference numerals in all the Figures.

DETAILED DESCRIPTION

A bumper 1 according to some embodiments is explained with reference to FIG. 1 to FIG. 5. A bumper 1 is used in the front or rear region, such as in the front region of the body of a motor vehicle.

Figure 5:
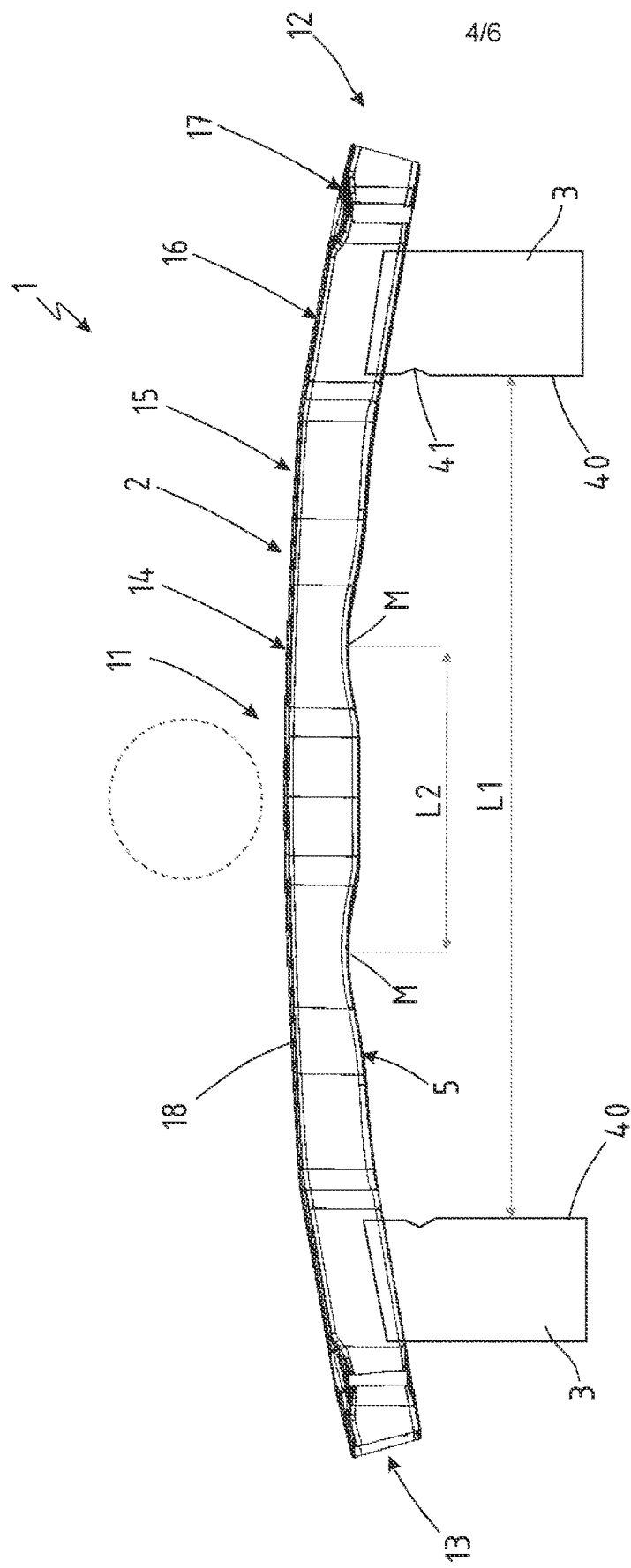
FIG. 5 is a plan view of the bumper in front of a stationary obstacle which is schematically indicated.

The bumper 1 has a transverse carrier 2 which can be secured transversely relative to the longitudinal carriers of a motor vehicle which are not illustrated in this instance. The transverse carrier 2 is supported on the longitudinal carriers by means of crash boxes 3 which are illustrated in FIG. 5. The crash boxes 3 should, in addition to the transverse carrier 2, absorb the energy resulting from an impact by this energy being converted into deformation work.

Figure 2:
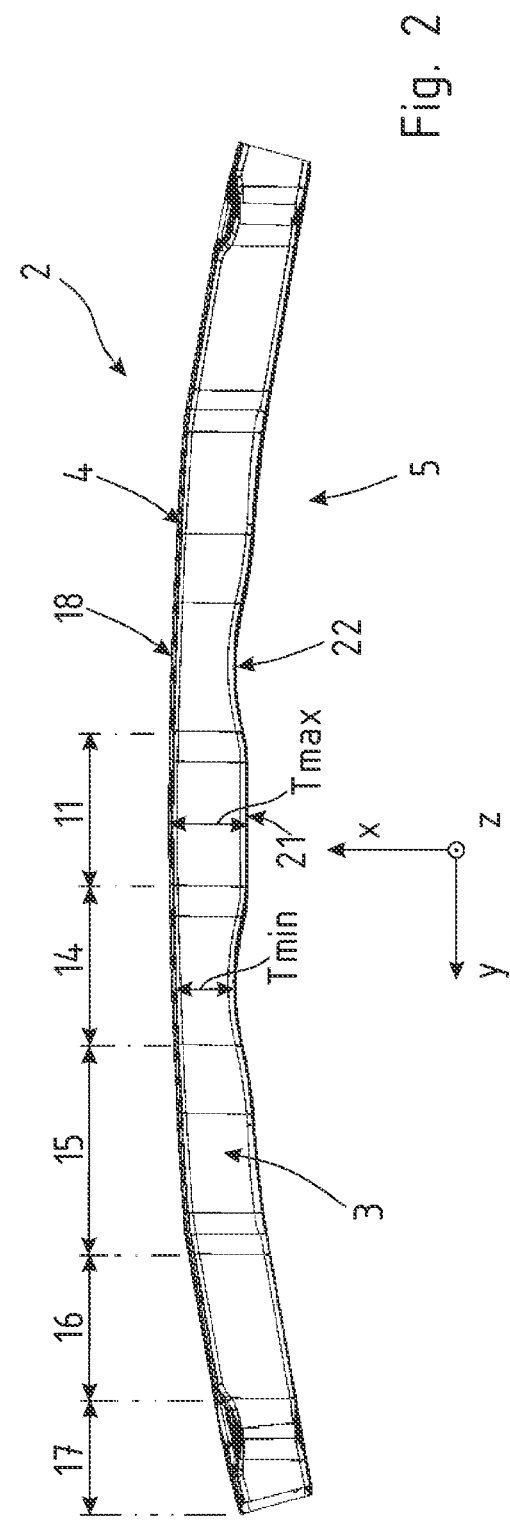
FIG. 2 is a plan view of the transverse carrier according to the illustration of FIG. 1.
Figure 3:
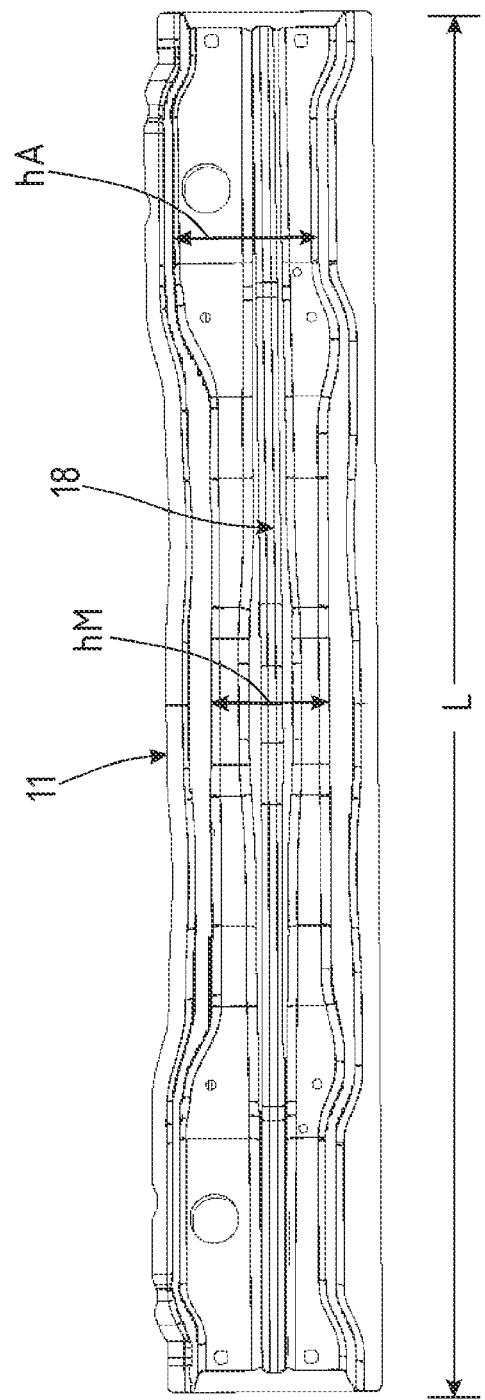
FIG. 3 is an end-side view of a shell member of a bumper according to some embodiments.

In FIG. 2, a vehicle coordinate system is illustrated in order to designate the axes within a motor vehicle or the bumper 1. The x axis and y axis are located in a horizontal plane (=road plane). The x axis (vehicle longitudinal axis) is located in the vehicle longitudinal center plane and is directed forward horizontally and in the movement direction of the vehicle. The y axis (vehicle transverse axis) is located perpendicularly on the vehicle longitudinal center plane and faces transversely relative to the movement direction of the vehicle. The z axis (vehicle vertical axis) is located perpendicularly in the xy plane of the vehicle and faces upward with the positive direction thereof.

The transverse carrier 2 has a shell member 5 which is open toward the front side 4 and which has a rear wall 6 and two outer members 7, 8 which are adjoined in each case at the end side by an outwardly directed longitudinal flange 9, 10. The shell member 5 is formed from a steel sheet and has a central longitudinal portion 11 which is adjoined at both sides in the direction toward both ends 12, 13 of the transverse carrier 2 by a transition portion 14, an intermediate portion 15, a crash box connection portion 16 and an end portion 17.

Over the majority of the length L thereof, the shell member 5 is closed by means of a closure plate 18 which forms the front side 4. The closure plate 18 may extend over the entire length L of the shell member 5. The majority of the length L of the shell member 5 extends over the central longitudinal portion 11 and in both directions toward the ends 12, 13 over the transition portion 14, the intermediate portion 15 and the crash box connection portion 16. The closure plate 18 extends symmetrically from the central portion 11 into the region where a crash box connection portion 16 stops and an end portion 17 begins.

The shell member 5 and the closure plate 18 comprise sheet steel, an ultra-high-strength cold-formed steel or a hot-formed steel, or a boron/manganese alloyed high-strength steel material. When a hot-formed steel is used, the shell member 5 and/or the closure plate 18 are hot-formed and press-hardened.

The closure plate 18 is in abutment at the front side 4 via the outer longitudinal portions 19, 20 thereof with the longitudinal flanges 9, 10 of the shell member 5 and is joined at that location to the shell member 5.

The shell member 5 has in the rear wall region 21 of the central longitudinal portion 11 and in the rear wall region 22 of the transition portions 14 a bead 23 which is directed toward the front side 4. The shell member 5 thereby has in the central longitudinal portion 11 and in the transition portions 14 a profile which is W-shaped in cross-section. The bead 23 of the shell member 5 has two inner members 24, 25 which extend obliquely with respect to the vehicle x axis at an opening angle α. These members are connected to each other at the front side by means of a web 26. The web 26 is orientated in the vehicle y axis and extends parallel with the front side 4 of the shell member 5.

Figure 4:
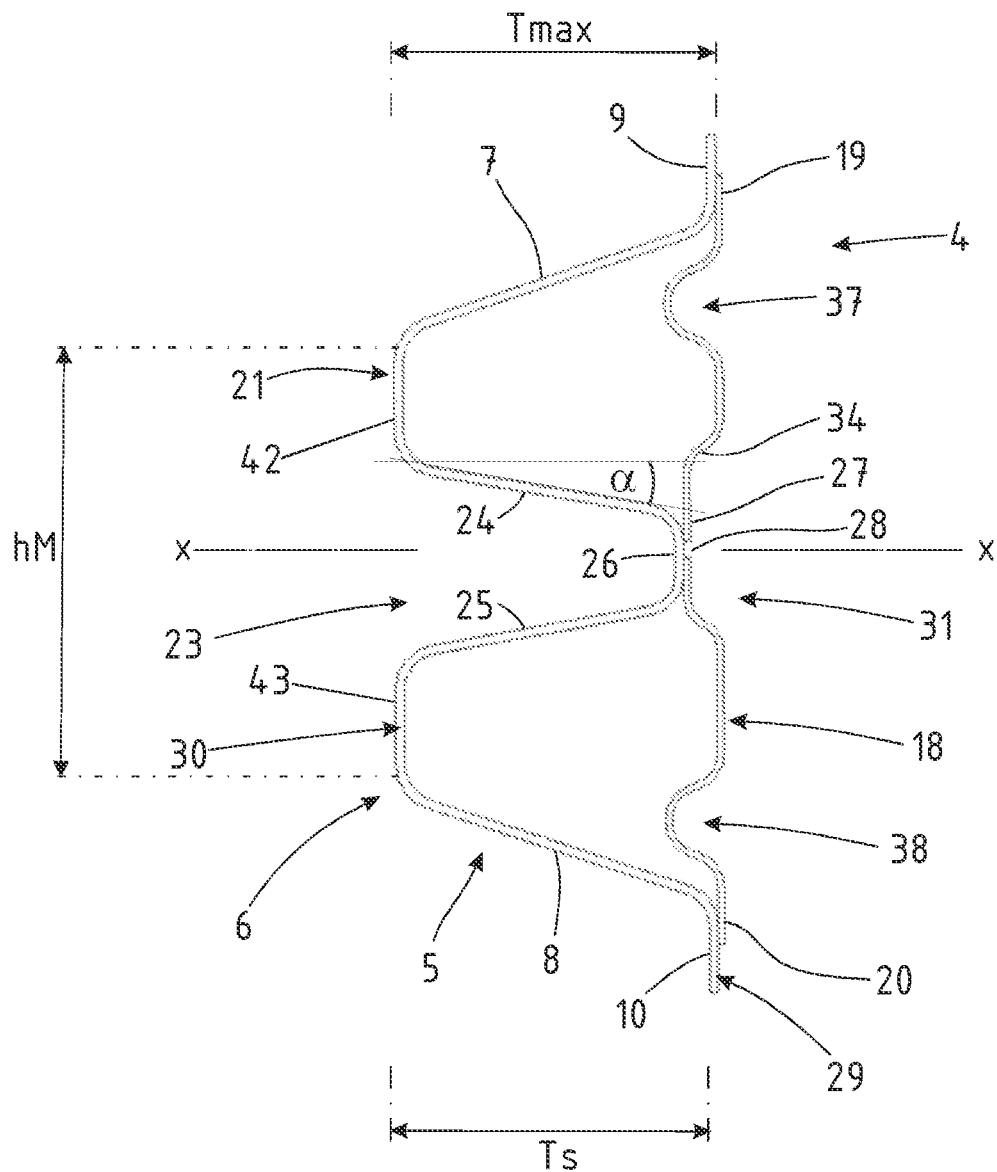
FIG. 4 is a vertical cross-section through the transverse carrier according to the illustration of FIG. 1 along the line A-A.

As can be seen in the illustration of FIG. 4, the bead 23 of the shell member 5 contacts the closure plate 18 with the front web 26 thereof. In the contact region between the web 26 and the closure plate 18, they are joined together in a materially engaging manner by means of welding. This may, for example, be carried out by means of plug welding. To this end, there are provided in the base 27 of a closure plate bead 31 in the region of the central longitudinal axis 11 two elongate holes 28, through which the plug welding is carried out.

The bead 23 extends over the length L of the shell member 5 as far as the end portions 17 thereof. The depth of the bead 23 varies over the length L.

In the transition portions 14, the shell member 5 has a minimum depth Tmin which is less than the maximum depth Tmax in the central longitudinal portion 11. The minimum depth Tmin in the transition portion 14 and the maximum depth Tmax in the central longitudinal portion 11 is in each case measured in a vehicle x axis between a foremost outer face 29 of the shell member 5 and a rearmost outer face 30 of the shell member 5. The minimum depth Tmin is at least 5%, more than 10%, more than 15%, but a maximum of 35% less than the maximum depth Tmax in the central longitudinal portion 11.

In the transition portions 14, the rear wall region 22 extends in a concave-curved manner. The curvature relates to a view of the rear wall region 22 in longitudinal section or to a view of the rear wall region 22 when viewed from the vehicle.

The transition portions 14 are configured as trigger zones of the transverse carrier 2. The configuration is such that the transition portions 14 in the event of an impact with an obstacle initially become deformed and initiate the deformation operation. The central longitudinal portion 11 which is located between the transition portions 14 is in the event of a central impact initially not deformed and displaced inward in the direction of the motor vehicle depending on the severity of the impact. The system is configured in such a manner that the impact energy is introduced via the transverse carrier 2 with the lowest possible bending torque into the crash boxes 3 and consequently also the longitudinal carriers. The bumper 1 has a high energy absorption capacity with improved deformation behavior.

The closure plate 18 is slightly shorter than the shell member 5 so that, at the lateral ends 12, 13 of the shell member 5 or the transverse carrier 2, a short region is not closed by the closure plate 18 in each case.

Figure 1:
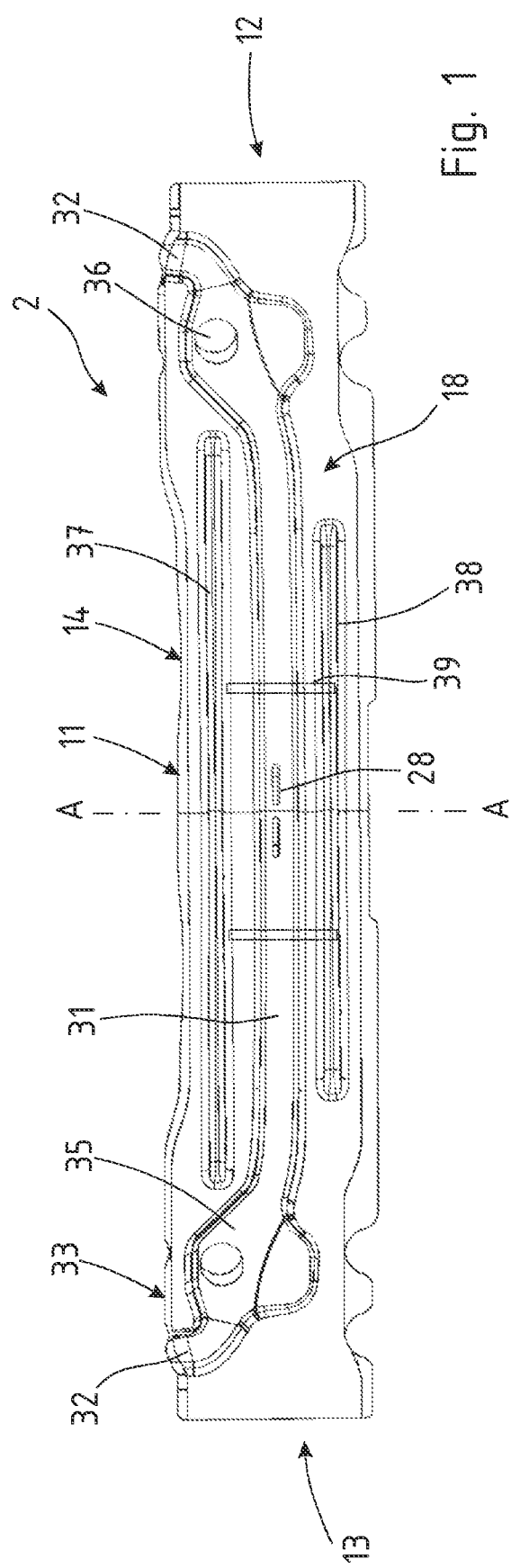
FIG. 1 is a front view of the transverse carrier of a bumper according to some embodiments.

The closure plate 18, as can be seen in FIG. 1 and FIG. 4, has a central closure plate bead 31 which extends substantially in the central longitudinal plane of the closure plate 18. The closure plate bead 31 is directed inward relative to the shell member 5 and extends over the central longitudinal portion 11, the transition portions 14, the intermediate portions 15 and the crash box connection portions 16 into the end portions 17. In the region of the end portions 17, the closure plate bead 31 has in each case a bead end portion 32 which extends transversely upward from the longitudinal axis of the closure plate 18. The bead end portion 32 terminates at the upper longitudinal edge 33 of the closure plate 18.

The closure plate bead 31 has a flat groove contour with the base 27 which extends parallel with the web 26 of the bead 23 in the shell member 5 and lateral transitions 34 which are constructed in a rounded manner.

The bead 23 has a depth Ts which reaches close to the front side 4 of the shell member 5. The depth Ts is measured between the rear side of the shell member 5 as far as the outer face of the web 26. The depth Ts of the bead 23 is from 5% to 15% smaller or shorter than the depth Tmax in the central longitudinal portion 11. Consequently, the closure plate bead 31 is relatively flat.

In the region of the crash box connection portions 16, the closure plate bead 31 has a formed flattened region 35 which deviates from the groove contour. Through-openings 36 for a towing lug are located therein. The flattened region 35 is expanded in an upward and downward direction, wherein the central closure plate bead 31 extends through the flattened region 35 and continues in the bead end portions 32.

The closure plate 18 of the transverse carrier 2 or bumper 1 has with vertical spacing above and below the central closure plate bead 31 another closure plate bead 37, 38. These beads are also configured in a groove-like manner and are directed inward in the direction toward the shell member 5. The groove contour of the closure plate beads 37, 38 is rounded and deeper than the central closure plate bead 31. The upper closure plate bead 37 and the lower closure plate bead 38 are shorter than the central closure plate bead 31. The upper closure plate bead 37 terminates in the region of the transition between the intermediate portion 15 and the crash box connection portion 16. The lower closure plate bead 38 extends over the central longitudinal portion 11 and the transitions portions 14 into the intermediate portion 15.

Optionally, the closure plate 18 is provided in the region of the transition portions 14 with weakness zones 39, as indicated in FIG. 1. The weakness zones 39 may be produced as slots in the closure plate. The weakness zones 39 may also be configured by means of a strength reduction in the material of the closure plate 18.

In FIG. 4, the opening angle α of the inner members 24, 25 which extend obliquely from the rear wall region 21 forward toward the web 26 is indicated. The opening angle α is produced from the oblique position of the inner members 24, 25 relative to the vehicle x axis.

The opening angle α is sized between 3° and 20° inclusive. Such an opening angle α is for the production of the shell member 5 and additionally supports the energy absorption capacity and the deformation behavior of the transverse carrier 2 as a whole.

The shell member 5 has in the central longitudinal portion 11 a height hM measured at the rear wall 6 between the outer members 7, 8 in the vehicle z axis. Furthermore, the shell member 5 has in each case in a crash box connection portion 16 a height hA measured at the rear wall 6 between the outer members 7, 8 in the vehicle z axis. The height hM in the central longitudinal portion 11 is sized to be smaller than the height hA in the crash box connection portion 16. The height hM and the height hA is measured in each case at the rear wall 6 of the shell member 5 before the base webs 42, 43 merge into a curvature to form the outer members 7, 8.

Furthermore, the shell member 5 has a length L1 which is measured between the mutually facing inner side walls 40 of the crash boxes 3. The shell member 5 further has a length L2 measured between the centers M of the transition portions 14 in the y direction. This length L2 is sized to be between 0.15 times to 0.5 times the length L1.

With regard to FIG. 5, it can further be seen that the crash boxes 3 have desired deformation locations 41. Such a desired deformation location 41 is formed by means of a vertical bead on the inner side wall 31 of the crash box 3.

Figure 6:
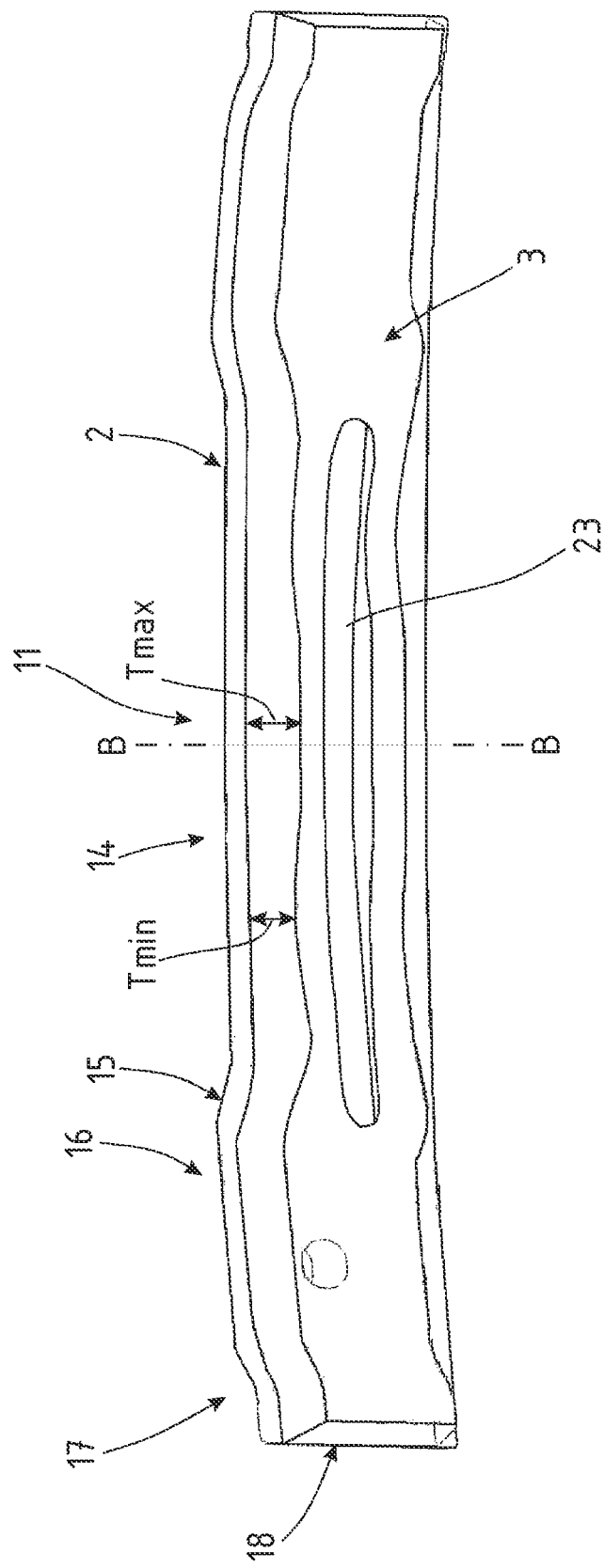
FIG. 6 is a rear view of the transverse carrier of a bumper according to some embodiments.

The transverse carrier 2 of a bumper 1 which is explained with reference to FIG. 6 to FIG. 8 corresponds in principle to the one described and is given the same reference numerals. Reference is made to the explanation above. The transverse carrier 2 has a shell member 5 which is open toward the front side 4 and which has a rear wall 6 and two outer members 7, 8 which are adjoined at the end side in each case by an outwardly directed longitudinal flange 19. A closure plate 18 is provided at the front side.

The shell member 5 has in the rear wall region 21 of the central longitudinal portion 11 and in the rear wall region 22 of the transition portions 14 a bead 23 which is directed toward the front side 4. Accordingly, the shell member 5 has a profile which is W-shaped in cross-section at that location.

The depth Ts of the bead extends up to more than half the depth Tmax of the shell member in the central longitudinal portion 11. In the longitudinal direction, the bead 23 extends over the central longitudinal portion 11 and the transition portions 14. The bead 23 terminates in the intermediate portions 16 in the rear wall 6 of the shell member 5.

Figure 7:
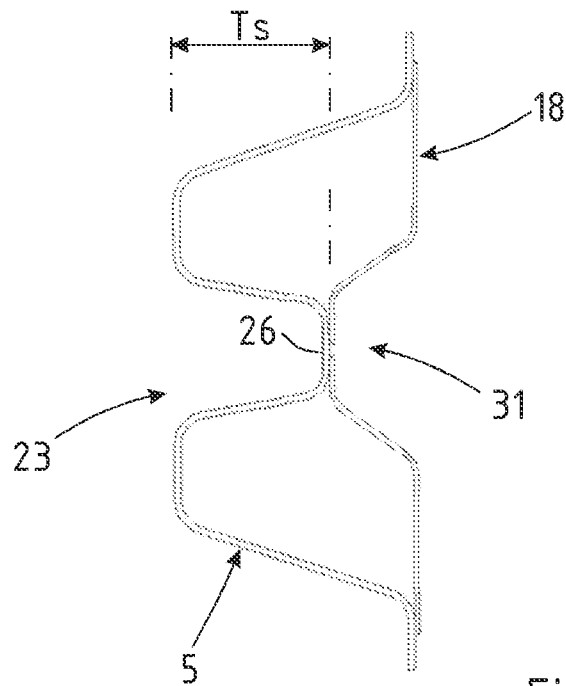
FIG. 7 is a vertical section through the transverse carrier according to the illustration of FIG. 6 along the line B-B in a first construction variant.

The closure plate 18, as illustrated in FIG. 7, has a central closure plate bead 31. This bead contacts the web 26 of the bead 23 and is joined at that location.

Figure 8:
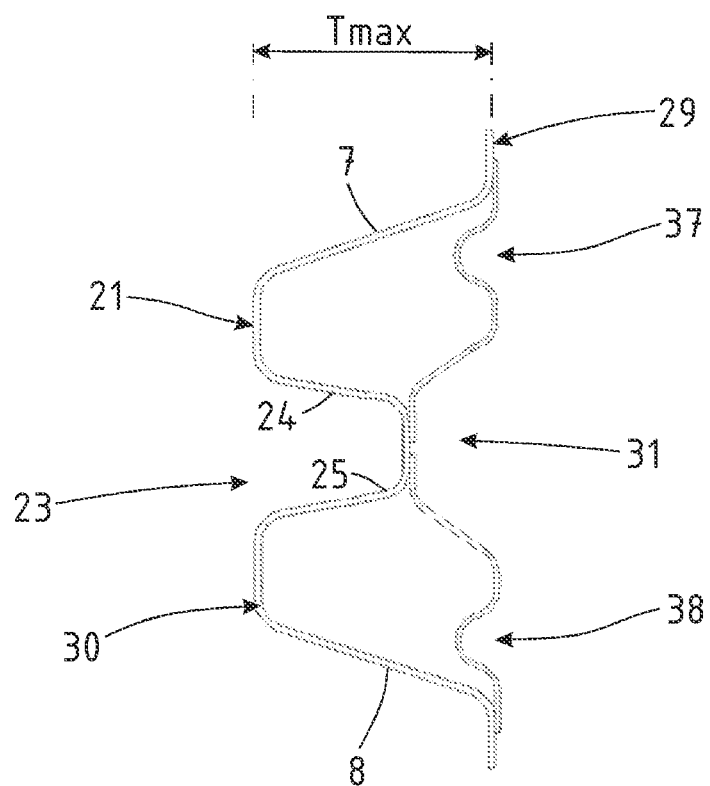
FIG. 8 is a cross-section through a transverse carrier according to the illustration of FIG. 6 along the line B-B with a second construction variant.

The closure plate 18, as illustrated in FIG. 8, has the central closure plate bead 31 and an upper closure plate bead 37 and a lower closure plate bead 38 which are arranged with vertical spacing thereabove and therebelow.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A motor vehicle bumper, comprising:
a transverse carrier configured to be secured transversely relative to longitudinal carriers of a motor vehicle by crash boxes,
wherein
the transverse carrier has a shell member and a closure plate,
the shell member is open toward a front side,
the shell member has a rear wall and two outer members,
each of the two outer members has an outwardly directed longitudinal flange,
the shell member has a central longitudinal portion which is adjoined, in a direction towards each of two ends of the transverse carrier, by a transition portion, an intermediate portion and a crash box connection portion,
the shell member is closed at least over a majority of a length of the shell member by the closure plate,
the closure plate forms the front side,
the rear wall of the shell member has, in the central longitudinal portion and in the transition portions, a bead,
the bead is directed toward the front side so that the shell member has, in the central longitudinal portion and in the transition portions, a profile which is W-shaped in cross-section,
the shell member has in the transition portions a minimum depth which is less than a maximum depth in the central longitudinal portion, and
the minimum depth in the transition portion and the maximum depth in the central longitudinal portion are measured in a vehicle x-axis between a foremost outer face of the shell member and a rearmost outer face of the shell member.

2. The motor vehicle bumper according to claim 1, wherein the rear wall extends in a concave manner in the transition portions.

3. The motor vehicle bumper according to claim 1, wherein the bead of the shell member has a front web which contacts the closure plate.

4. The motor vehicle bumper according to claim 3, wherein the front web of the bead and the closure plate are joined together.

5. The motor vehicle bumper according to claim 1, wherein the closure plate has at least one closure plate bead which extends in a longitudinal direction of the closure plate.

6. The motor vehicle bumper according to claim 5, wherein the at least one closure plate bead is directed inward relative to the shell member.

7. The motor vehicle bumper according to claim 5, wherein the at least one closure plate bead extends over the central longitudinal portion, the transition portions and the crash box connection portions into end portions of the shell member.

8. The motor vehicle bumper according to claim 5, wherein the at least one closure plate bead has, in each of end portions of the shell member, a bead end portion which extends transversely from a longitudinal axis of the closure plate in an upward or downward direction.

9. The motor vehicle bumper according to claim 8, wherein the bead end portion terminates at an upper longitudinal edge or a lower longitudinal edge of the closure plate.

10. The motor vehicle bumper according to claim 1, wherein the closure plate has at least two closure plate beads which are arranged with vertical spacing one above the other.

11. The motor vehicle bumper according to claim 1, wherein the closure plate has weakness zones in a region of the transition portions.

12. The motor vehicle bumper according to claim 1, wherein the bead of the shell member has two inner members which extend obliquely relative to the vehicle x-axis at an opening angle, and the opening angle is from 3° to 20°.

13. The motor vehicle bumper according to claim 1, wherein
the shell member has, in the central longitudinal portion, a first height measured at the rear wall between the outer members in a vehicle z-axis,
the shell member has in each of the crash box connection portions a second height measured at the rear wall between the outer members in the vehicle z-axis, and
the first height is less than the second height.

14. The motor vehicle bumper according to claim 1, wherein
the shell member has a first length measured between mutually facing inner side walls of the crash boxes,
the shell member has a second length measured between centers of the transition portions, and
the second length is from 0.15 to 0.5 times the first length.

15. The motor vehicle bumper according to claim 1, wherein the crash boxes have deformation locations, and the deformation locations have vertical beads in inner side walls of the crash boxes.

* * * * *